J. F. CARTER.
TIRE SETTING TOOL.
APPLICATION FILED JULY 6, 1911.
1,017,956.
Patented Feb. 20, 1912.
2 SHEETS—SHEET 1.
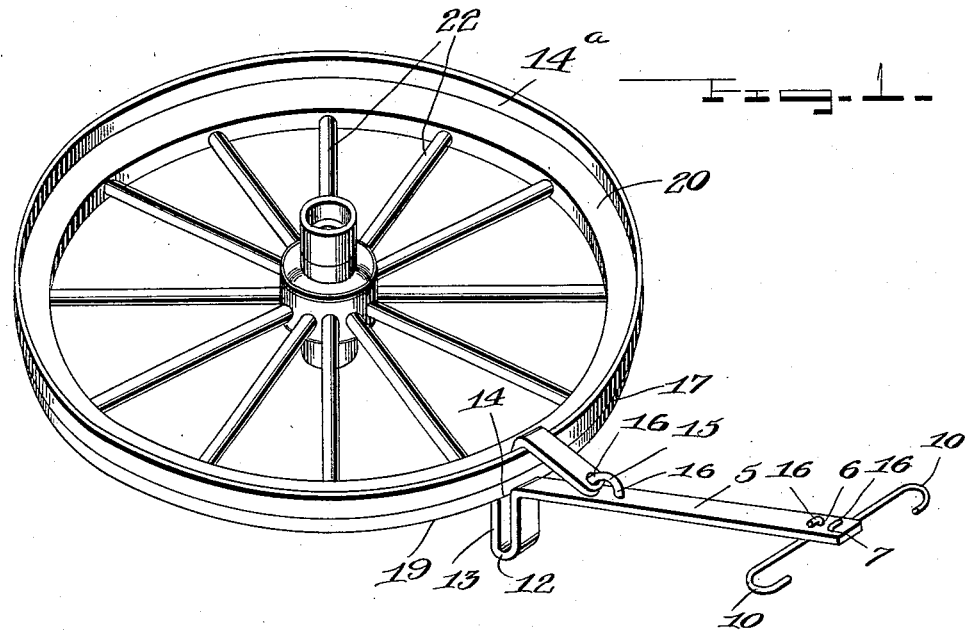
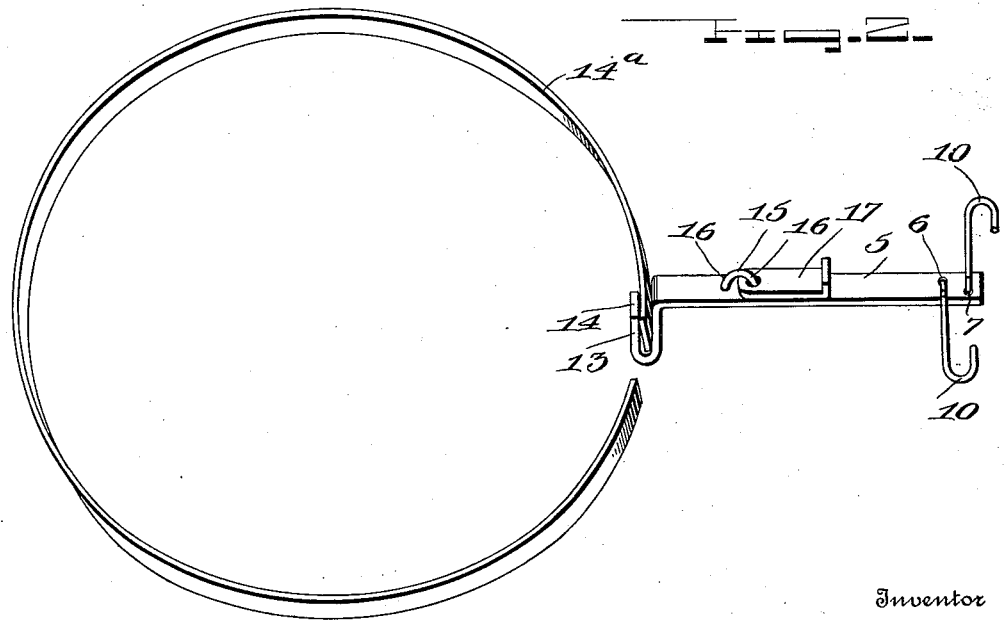
Witnesses
Inventor
J. F. Carter
By
Attorneys

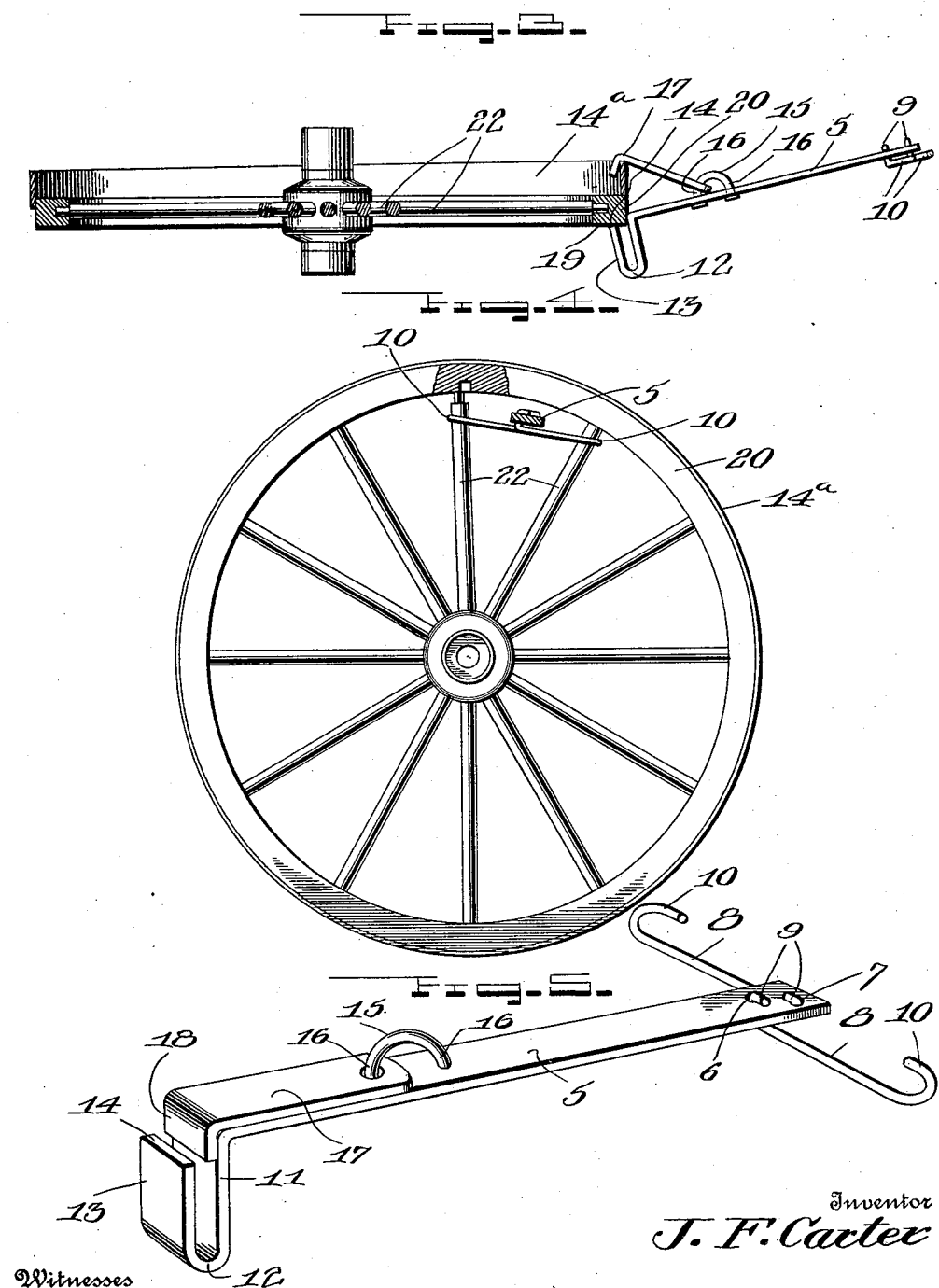

UNITED STATES PATENT OFFICE.

JAMES F. CARTER, OF WADLEY, ALABAMA.

TIRE-SETTING TOOL.

1,017,956.  Specification of Letters Patent.  Patented Feb. 20, 1912.

Application filed July 6, 1911. Serial No. 637,179.

*To all whom it may concern:*

Be it known that I, JAMES F. CARTER, a citizen of the United States, residing at Wadley, in the county of Randolph, State of Alabama, have invented certain new and useful Improvements in Tire-Setting Tools; and I do hereby declare the following to be a full, clear, and exact description of the invention, such as will enable others skilled in the art to which it appertains to make and use the same.

This invention relates to an improvement in compound tools.

The principal object of the invention is to provide a tool adapted for use in connection with the welding of tires, wherein there is provided at one end of the tool a jaw adapted to engage the tire and thereby hold the tire while the same is either being turned in a forge or while being carried from the forge to a wheel.

Another object of the invention is to provide a tool of the character described, the jaw thereof being adapted for engagement with the rim of a wheel, and having a hook adapted to engage the tire to draw the same on to the felly of the wheel by pressure exerted upon the tool.

A further object of the invention is to provide a tool for the purpose described, which includes a shank having a pair of oppositely disposed hooks pivotally connected at one end thereto for drawing the spokes of a wheel into the openings of the felly.

A still further object of the invention is to provide a tool for the purposes described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

In the drawings:—Figure 1 is a perspective view showing the tool employed in attaching a tire to a wheel, Fig. 2 is a perspective view of the tool showing the same engaged with a tire for carrying the latter, Fig. 3 is a detail sectional view through Fig. 1, the tool being shown in elevation, Fig. 4 is an elevation, partly in section, showing the tool employed as a spoke stretcher, and Fig. 5 is a perspective view of the tool.

Like reference numerals designate corresponding parts in all the figures of the drawings.

Referring to the drawings, the tool is preferably of metal and comprises a body portion 5 having a pair of oppositely disposed and spaced openings 6 and 7 formed near one end thereof. Spoke gripping elements 8—8 of rod iron each have one end bent to form a hook 9, which is disposed within one of the openings 6 or 7, the other end of the element being bent to form a hook 10 which is disposed in a plane at right angles to the hook 9 and in a plane parallel to the body portion 5 of the tool. The other end of the body portion 5 is bent at right angles as indicated by the reference numeral 11, and thence forwardly as indicated by 12 and then inwardly and parallel to the portion 11 as indicated by the reference numeral 13, the extreme end 14 thereof terminating in a plane slightly below the plane of the body portion 5. The last mentioned or end portion 13 is spaced from the portion 11 a distance slightly greater than the thickness of a tire. It will be observed in this connection that this end of the body portion forms a seat in which a tire $14^a$ may be placed for either turning the same while in a forge or carrying it from the forge to a wheel or the like, as clearly seen in Fig. 1 of the drawings.

Secured to the body portion 5 intermediate its ends and in close proximity to the last mentioned end is a staple 15, the legs 16—16 whereof pass through suitable openings formed in the body portion 5 and have their free ends riveted thereto. This staple is disposed longitudinally of the body portion 5, and mounted thereon for movement is a hook 17, said hook being formed with an opening near one end wherethrough passes one of the legs 16 of the staple. This hook is also formed from bar iron, and is preferably of a width equal to the width of the body portion 5. The hook extends from the staple 15 toward the end of the body portion opposite the hooks 8, and has its free end 18 bent at substantially right angles and normally disposed between the portions 11 and 13. In using this device, as indicated in Figs. 2 and 3, the free end 13 is engaged with the under face of the wheel felly 20, and the end 18 of the hook 17 is engaged over the upper edge of the tire. Pressure is then exerted upon the opposite end of the tool, and by this means the tire is forced onto the felly.

When it is desired to use the tool to draw a pair of spokes 22—22 toward each other for their insertion into the usual openings of the felly 20, the hooks 10 of the spoke gripping elements 8 are engaged with the respective spokes, and the body portion 5 is then employed as a lever to draw the spokes together as will be readily understood.

What is claimed is:

A tool of the class described consisting of a body portion formed of metal constituting a handle, one end of the body portion being bent at right angles and thence forwardly and thence inwardly to form an offset hook, a staple secured to the body portion adjacent the hook and projecting from the body portion in a direction opposite the hook, and a hook movably connected at one end with said staple.

In testimony whereof, I affix my signature, in presence of witnesses.

JAMES F. CARTER.

Witnesses:
H. F. Hodge,
J. M. Hodge,
W. H. Welch.

Copies of this patent may be obtained for five cents each, by addressing the "Commissioner of Patents, Washington, D. C."